United States Patent
Luo (10) Patent No.: US 11,729,612 B2
(45) Date of Patent: Aug. 15, 2023

(54) SECURE BLE JUST WORKS PAIRING METHOD AGAINST MAN-IN-THE-MIDDLE ATTACK

(71) Applicant: Cypress Semiconductor Corporation, San Jose, CA (US)

(72) Inventor: Hui Luo, Marlboro, NJ (US)

(73) Assignee: Cypress Semiconductor Corporation, San Jose, CA (US)

( * ) Notice: Subject to any disclaimer, the term of this patent is extended or adjusted under 35 U.S.C. 154(b) by 172 days.

(21) Appl. No.: 16/291,160

(22) Filed: Mar. 4, 2019

(65) Prior Publication Data

US 2019/0281449 A1    Sep. 12, 2019

Related U.S. Application Data

(60) Provisional application No. 62/640,398, filed on Mar. 8, 2018.

(51) Int. Cl.
| | |
|---|---|
| *H04W 12/03* | (2021.01) |
| *H04L 9/40* | (2022.01) |
| *H04L 9/32* | (2006.01) |
| *H04L 9/30* | (2006.01) |
| *H04W 12/041* | (2021.01) |

(Continued)

(52) U.S. Cl.
CPC ............ *H04W 12/03* (2021.01); *H04L 9/30* (2013.01); *H04L 9/321* (2013.01); *H04L 9/3236* (2013.01); *H04L 9/3247* (2013.01); *H04L 9/3268* (2013.01); *H04L 63/029* (2013.01); *H04L 63/0442* (2013.01); *H04W 12/041* (2021.01); *H04W 12/0431* (2021.01); *H04W 12/069* (2021.01); *H04W 12/50* (2021.01); *H04L 2209/80* (2013.01)

(58) Field of Classification Search
CPC .................................................. H04W 12/001
See application file for complete search history.

(56) References Cited

U.S. PATENT DOCUMENTS

| | | |
|---|---|---|
| 8,661,256 B2 | 2/2014 | Willey |
| 9,107,069 B2 | 8/2015 | Engelien-Lopes |

(Continued)

FOREIGN PATENT DOCUMENTS

| | | |
|---|---|---|
| EP | 2887715 A1 | 6/2015 |
| WO | 2016080798 A1 | 5/2016 |

(Continued)

OTHER PUBLICATIONS

International Search Report for International application No. PCT/US19/20798 dated May 24, 2019, 2 pages.

(Continued)

*Primary Examiner* — Simon P Kanaan (57) ABSTRACT

A method includes transmitting one or more segments of a security certificate on a wireless advertising channel of a peripheral device, where at least one of the segments of the security certificate identifies an authentication server, participating in a public key exchange between the peripheral device and a host device by transmitting a signed public key of the peripheral device, where the signed public key is signed in the security certificate, and transmitting one or more encrypted messages from the peripheral device to the host device via a first secure connection established based on the public key.

20 Claims, 9 Drawing Sheets

(51) Int. Cl.
  *H04W 12/50* (2021.01)
  *H04W 12/069* (2021.01)
  *H04W 12/0431* (2021.01)

(56) References Cited

U.S. PATENT DOCUMENTS

| | | | |
|---|---|---|---|
| 9,189,225 B2 * | 11/2015 | Boone | G06F 8/654 |
| 9,794,753 B1 | 10/2017 | Stitt et al. | |
| 9,900,091 B2 | 2/2018 | Choi et al. | |
| 9,930,240 B2 | 3/2018 | Song | |
| 9,942,328 B2 | 4/2018 | Holland et al. | |
| 9,979,625 B2 | 5/2018 | McLaughlin et al. | |
| 10,051,076 B2 | 8/2018 | Acar | |
| 10,087,063 B2 | 10/2018 | Zimmerman et al. | |
| 2007/0168301 A1 * | 7/2007 | Eisner | H04L 63/0209 |
| | | | 705/79 |
| 2011/0217950 A1 | 9/2011 | Kozlay | |
| 2011/0231902 A1 * | 9/2011 | Nagasaki | H04L 41/0806 |
| | | | 726/3 |
| 2015/0188929 A1 * | 7/2015 | Kitahara | H04N 21/2541 |
| | | | 726/10 |
| 2016/0234683 A1 * | 8/2016 | Bone | H04L 63/062 |
| 2016/0366229 A1 * | 12/2016 | Yamaura | H04W 12/0609 |
| 2017/0339128 A1 | 11/2017 | Lim et al. | |
| 2018/0041484 A1 * | 2/2018 | Gifford | H04L 9/3263 |
| 2018/0205475 A1 * | 7/2018 | Wendling | G06F 21/10 |
| 2019/0044738 A1 * | 2/2019 | Liu | H04W 4/40 |
| 2020/0396080 A1 * | 12/2020 | Yoo | H04L 9/3236 |

FOREIGN PATENT DOCUMENTS

| | | |
|---|---|---|
| WO | 2018004303 A1 | 1/2018 |
| WO | 2018004584 A1 | 1/2018 |
| WO | 2018151778 A1 | 8/2018 |

OTHER PUBLICATIONS

Written Opinion of the International Searching Authority for International application No. PCT/US19/20798 dated May 24, 2019, 5 pages.

Florina Almenanes Mendoza, Assessment of Fitness Tracker Security: A Case of Study, MDPI, proceedings, Oct. 26, 2018, 11 pages.

* cited by examiner

SECURE BLE JUST WORKS PAIRING METHOD AGAINST MAN-IN-THE-MIDDLE ATTACK

RELATED APPLICATIONS

This application claims priority to U.S. Provisional Application No. 62/640,398, filed on Mar. 8, 2018, which is incorporated by reference herein in its entirety.

TECHNICAL FIELD

This disclosure relates to the field of wireless communications and, in particular, to secure communications between wireless devices.

BACKGROUND

The Internet of things (IoT) extends network connectivity beyond standard computing devices, such as desktops, laptops, smartphones and tablets, to a wider range of physical devices and everyday objects, such as vehicles, home appliances, entertainment devices, etc. IoT-enabled devices contain processing logic, software, sensors, actuators, and/or connectivity features which allow them to communicate information and commands to each other. As connectivity spreads to a greater number of devices and the applications of that connectivity increase, the security of information and the communication of that information becomes increasingly important. The Internet of Things (IoT) introduces new security challenges as the points of access for malicious software and those seeking private information increases with the presence of ever more connected devices.

One wireless technology standard for establishing connections between devices is Bluetooth. Devices adhering to the Bluetooth standard pair with each other in order to establish a communication channel over which data and commands can be transmitted. One frequently used pairing method by Bluetooth devices is SSP (Secure Pairing Protocol) Just Works mode. This mode is susceptible to man-in-the-middle attacks by design, but is commonplace because it does not require user interface features such as keypads and displays for security credential configuration and/or verification. A man-in-the-middle attack is executed by secretly relaying communications between two connected parties that intend to communicate only with each other. The attacker is thus able to view and modify the information transmitted between the parties.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the claimed subject matter. It will be apparent to one skilled in the art, however, that at least some embodiments may be practiced without these specific details. In other instances, well-known components or methods are not described in detail or are presented in a simple block diagram format in order to avoid unnecessarily obscuring the claimed subject matter. Thus, the specific details set forth are merely exemplary. Particular implementations may vary from these exemplary details and still be contemplated to be within the scope of the claimed subject matter.

A commonly used pairing method by Bluetooth Low-Energy (BLE) devices is SSP (Secure Pairing Protocol) Just Works mode. Secure pairing modes other than Just Works can be used when at least one of the devices being paired has a keypad and that the other device has a display for security credential configuration and/or verification. However, it is impractical to include such user interface features in many peripheral devices (e.g., headphones) that utilize Bluetooth. Accordingly, such devices use the Just Works pairing mode for establishing secure connections. The Just Works mode provides protection against eavesdropping, but is ineffective at preventing man-in-the-middle (MITM) attacks.

In one embodiment, a method for pairing a peripheral device with a host device in Just Works mode adds protection against MITM attacks by allowing one device (e.g., the peripheral device) to advertise its security certificate or segments of its security certificate on a secondary advertising channel. The device then uses an elliptic-curve cryptography (ECC) public key endorsed by the advertised security certificate for the subsequent elliptic-curve Diffie-Hellman (ECDH) key generation to complete the pairing process in Just Works mode.

The peripheral device advertises its presence to the host device via a primary advertising channel and a secondary advertising channel. The protocol data unit (PDU) of the primary channel advertising uses the 'ADV_EXT_IND' type to signal that additional information is advertised on the secondary advertising channel. The secondary advertising channel PDU uses the 'AUX_ADV_IND' type. In one embodiment, the secondary advertising channel PDU contains an AD_TYPE=0x09. This AD_TYPE indicates that the PDU contains a complete local name of the peripheral device; the payload data includes the complete local name along with segments of the security certificate. Alternatively, a different AD_TYPE can be used to indicate to the recipient host device that a security certificate or segments of a security certificate of the peripheral device are contained in the PDU.

The advertised segments of the security certificate include a unique identifier (ID) for the peripheral device, an ECC public key of the peripheral device, a digital signature, a uniform resource locator (URL) of an authentication server whose private key is used to sign the public information of the security certificate into the digital signature, and the selected digital signature algorithms and parameters. The device-specific security certificate of the peripheral device is generated during the quality assurance (QA) process or at the first use of the peripheral device, supported by the authentication server after attestation of the peripheral device (e.g., by validating the firmware of the peripheral device).

At the first pairing with the peripheral device, the initiating host device obtains and authenticates the public key of the authentication server via a secure connection (e.g., via transport layer security (TLS)) with the server. The server's URL and public key are then saved into a non-volatile memory of the host device so that future pairings using the same authentication server can skip the online operation. After obtaining an authenticated public key for the authentication server, the host device initiates a public key exchange with the peripheral device, in which the peripheral device transmits its ECC public key (which is signed in the security certificate) to the host device. The host device completes pairing with the peripheral device in Just Works mode after successfully authenticating the ECC public key of the peripheral.

The above pairing process automatically defaults to Just Works mode if the host device initiating the connection does not implement the authentication functionality. That is, the Just Works pairing process completes normally even if the host device does not authenticate the ECC public key of the peripheral device. In this case, the host device initiates the public key exchange with the peripheral device and accepts the ECC public key provided by the peripheral device without authenticating it.

Figure 1:
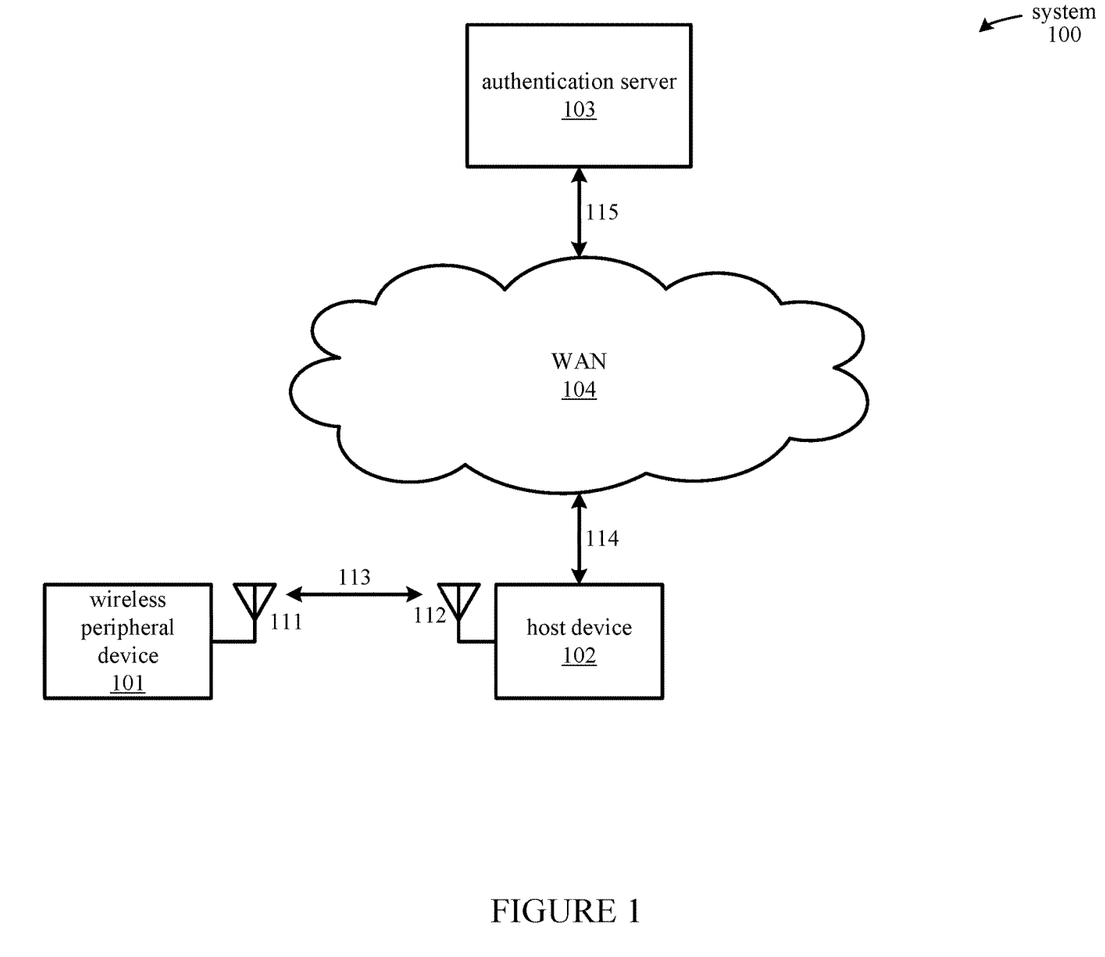
FIG. 1 is a block diagram of a computer network, according to an embodiment.

FIG. 1 illustrates an embodiment of a computer network system 100 that includes a wireless peripheral device 101, a host device 102, and an authentication server 103. The peripheral device can be embodied as any of a variety of different devices, such as headphones, speakers, computer mice, keyboards, smart speaker, etc. The host device can be embodied as any of a number of different types of devices such as a personal computer, mobile phone, tablet computer, vehicle infotainment system, etc.

The peripheral device 101 includes wireless communication interface 111, and the host device 102 includes wireless communication interface 112. The peripheral device 101 and host device 102 exchange messages wirelessly using their respective wireless interfaces 111 and 112 via a communication channel 113. In one embodiment, the communication channel 113 is a secure Bluetooth connection for exchanging messages in encrypted form.

The host device is also connected to a wide area network (WAN) such as the Internet via a network link 114. Through the WAN 104, the host device 102 is able to communicate with the authentication server 103. The authentication server 103 is connected to the WAN 104 via a network link 115 and is identified by a URL broadcast by the peripheral device 101. The authentication server provides online security certificate generation services to multiple peripheral devices (including peripheral device 101) and also assists host devices (including host device 102) to authenticate the ECC public keys of peripheral devices during the pairing process. In one embodiment, the authentication server 103 is operated and maintained on the Internet under the control of a manufacturer of the peripheral device or its contracted partner.

Figure 2A:
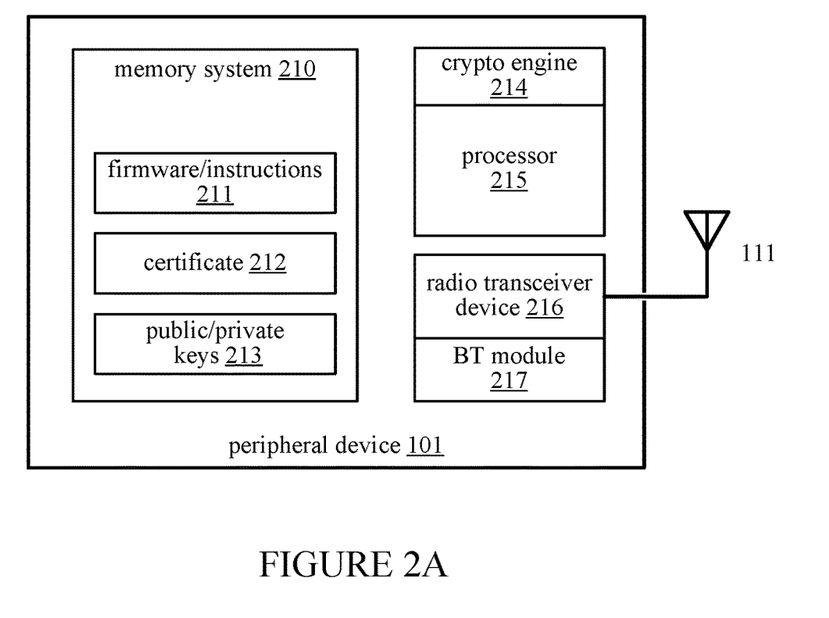
FIG. 2A illustrates a block diagram of a wireless peripheral device, according to an embodiment.

FIG. 2A is a block diagram illustrating circuit components in a peripheral device 101, according to an embodiment. The peripheral device 101 includes a number of components 210-217 that can communicate with each other either directly, or via one or more of the other components 210-217 (e.g., via shared memory). In one embodiment, the components 210-217 in the peripheral device 101 are contained within a single physical enclosure.

The peripheral device 101 additionally includes a radio transceiver 216 with a Bluetooth module 217 for transmitting and receiving data wirelessly over a connection with another Bluetooth device. Peripheral device 101 includes a processor 215 that receives and executes instructions 211 provided in firmware stored in the memory system 210. In one embodiment, the processor 215 executes the certificate request and pairing processes described herein according to the instructions 211 by directing other components in the peripheral device 101. Encryption and decryption operations for the certificate request and pairing processes are performed by the cryptographic engine 214.

The memory system 210 includes memory devices used by the peripheral device 101, such as random-access memory (RAM) modules, read-only memory (ROM) modules, non-volatile memory (NVM), hard disks, and/or other non-transitory computer-readable media. In addition to the firmware 211, the memory system 210 stores the security certificate 212 and an ECC public and private key pair 213 of the peripheral device 101, which are used in the pairing process.

The peripheral device 101 includes a wireless communication interface 111 that includes a radio transceiver 216 and a Bluetooth module 217. The radio transceiver 216 transmits and receives radio signals as directed by the Bluetooth module 217, which manages buffering, scheduling, segmentation, etc. of messages to be transmitted or received according to a Bluetooth protocol. In one embodiment, the Bluetooth module 217 also includes a cryptographic engine for encrypting and decrypting Bluetooth communications.

Figure 2B:
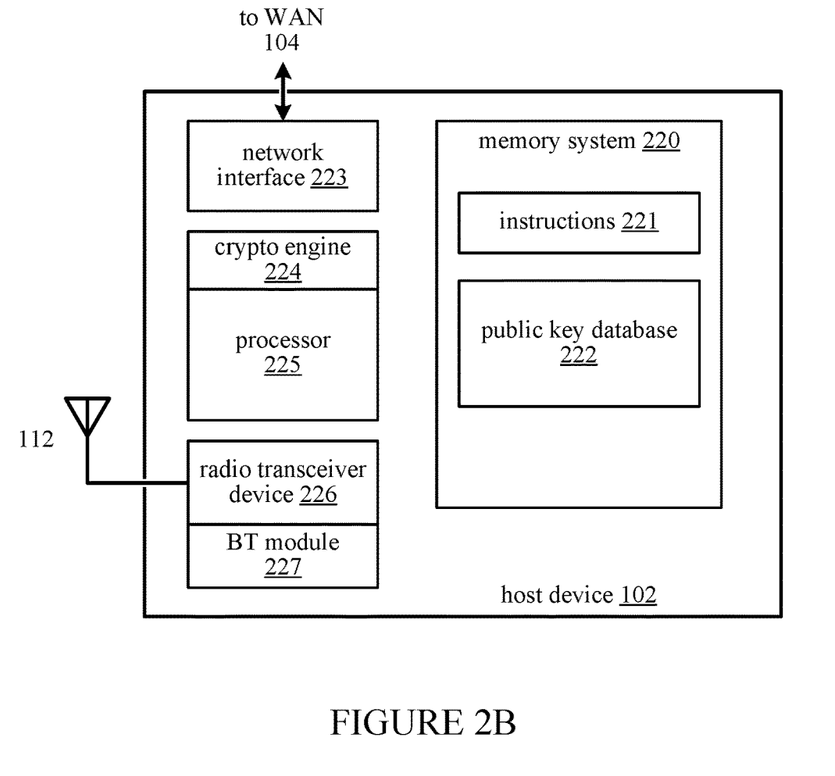
FIG. 2B illustrates a block diagram of a host device, according to an embodiment.

FIG. 2A is a block diagram illustrating circuit components in a host device 102, according to an embodiment. The host device 102 includes a number of components 220-227 that can communicate with each other either directly, or via one or more of the other components 220-227. In one embodiment, the components 220-227 in the host device 102 are contained within a single physical enclosure, such as a personal computer chassis or a mobile device casing.

The host device 102 additionally includes a radio transceiver 226 with a Bluetooth module 227 for transmitting and receiving data wirelessly over a connection with another Bluetooth device. Processor 225 receives and executes instructions 221 that are stored in the memory system 220. In one embodiment, the processor 215 executes the certificate request and pairing processes described herein according to the instructions 221 by directing other components in the host device 102. In one embodiment, encryption and decryption operations for the certificate and pairing processes are performed by the cryptographic engine 224.

The memory system 220 includes memory devices used by the host device 102, such as random-access memory (RAM) modules, read-only memory (ROM) modules, non-volatile memory (NVM), hard disks, and/or other non-transitory computer-readable media. In addition to the instructions 221, the memory system 220 stores a public key database 222. The public key database 222 associates network addresses (e.g., URLs, IP addresses, etc.) of one or more servers with their respective public keys. In one embodiment, the public key database 222 is located in non-volatile memory.

In the host device 102, wireless communication interface 112 includes a radio transceiver 226 and a Bluetooth module 227. The radio transceiver 226 transmits and receives radio signals as directed by the Bluetooth module 227, which manages buffering, scheduling, segmentation, etc. of messages to be transmitted and received according to a Bluetooth protocol. In one embodiment, the Bluetooth module 227 includes a cryptographic engine for encrypting and decrypting Bluetooth communications.

The host device 102 also includes a network interface 223 for transmitting and receiving data over a wired or wireless network. The host device 102 transmits and receives data over WAN 104 via the network interface 223.

Figure 2C:
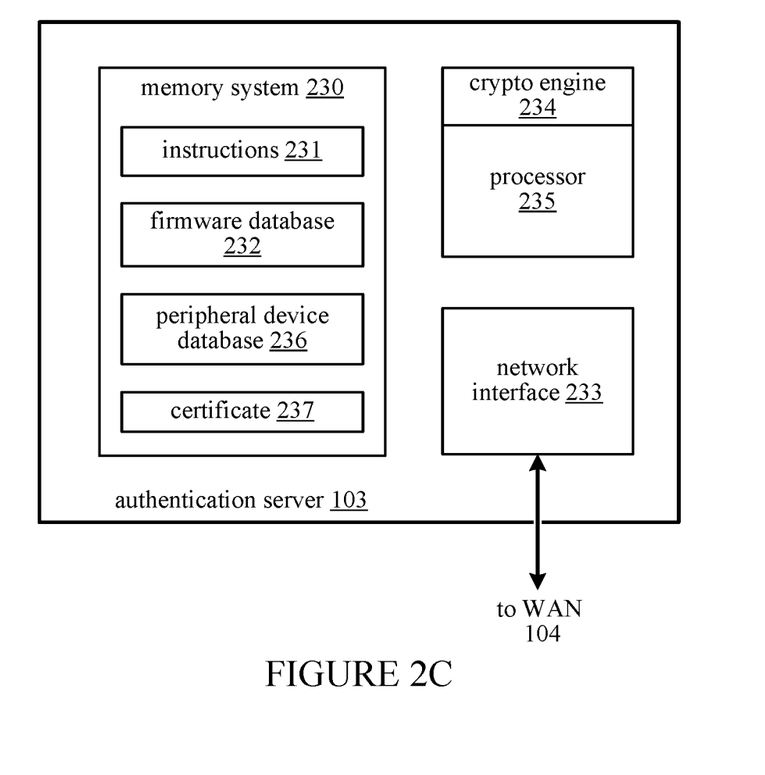
FIG. 2C illustrates a block diagram of an authentication server, according to an embodiment.

FIG. 2C is a block diagram illustrating circuit components in an authentication server 103, according to an embodiment. The authentication server 103 includes multiple components 230-235 that can communicate with each other either directly, or via one or more of the other components 230-235. In one embodiment, the components 230-235 in the authentication server 103 are contained within a single physical enclosure, such as a server chassis. In alternative embodiments, the components and/or functions of the server 103 are distributed among multiple physical devices.

Processor 235 receives and executes instructions 231 that are stored in the memory system 230. In one embodiment, the processor 235 executes the certificate generation and authentication processes described herein according to the instructions 231 by directing other components in the server 103. Encryption and decryption operations for the certificate and authentication processes are performed in the cryptographic engine 234.

The memory system 230 includes memory devices used by the authentication server 103, such as random-access memory (RAM) modules, read-only memory (ROM) modules, non-volatile memory (NVM), hard disks, and/or other non-transitory computer-readable media. In addition to the instructions 231, the memory system 230 stores a firmware database 232 and a peripheral device database 236. The memory 230 also stores a security certificate 237 for the server 103 issued by a major certificate authority (CA).

The server 103 also includes a network interface 233 for transmitting and receiving data over a wired or wireless network. The server 103 transmits and receives data over WAN 104 via the network interface 233.

Figure 2D:
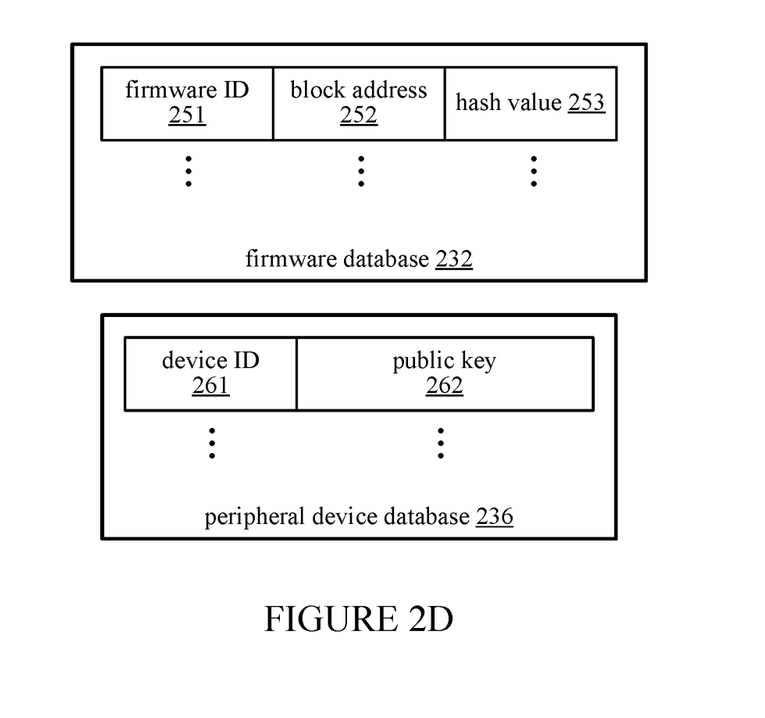
FIG. 2D illustrates entries in a firmware database and a peripheral device database, according to an embodiment.

FIG. 2D illustrates a firmware database 232 and a peripheral device database 236 in the authentication server 103, according to an embodiment. Each entry in the firmware database 232 associates a firmware identifier 251 with a block address 252 of the identified firmware and a hash value 253 derived from the firmware block located at the block address 252. The firmware database 232 can contain entries for multiple types of peripheral devices, and for multiple firmware versions for each type of peripheral device. The firmware database 232 is used to attest peripheral devices that request security certificates from the server 103. In the peripheral device database 236, each entry associates a device ID 261 with an ECC public key 262 for each peripheral device for which the server 103 already issued a security certificate.

Figure 3:
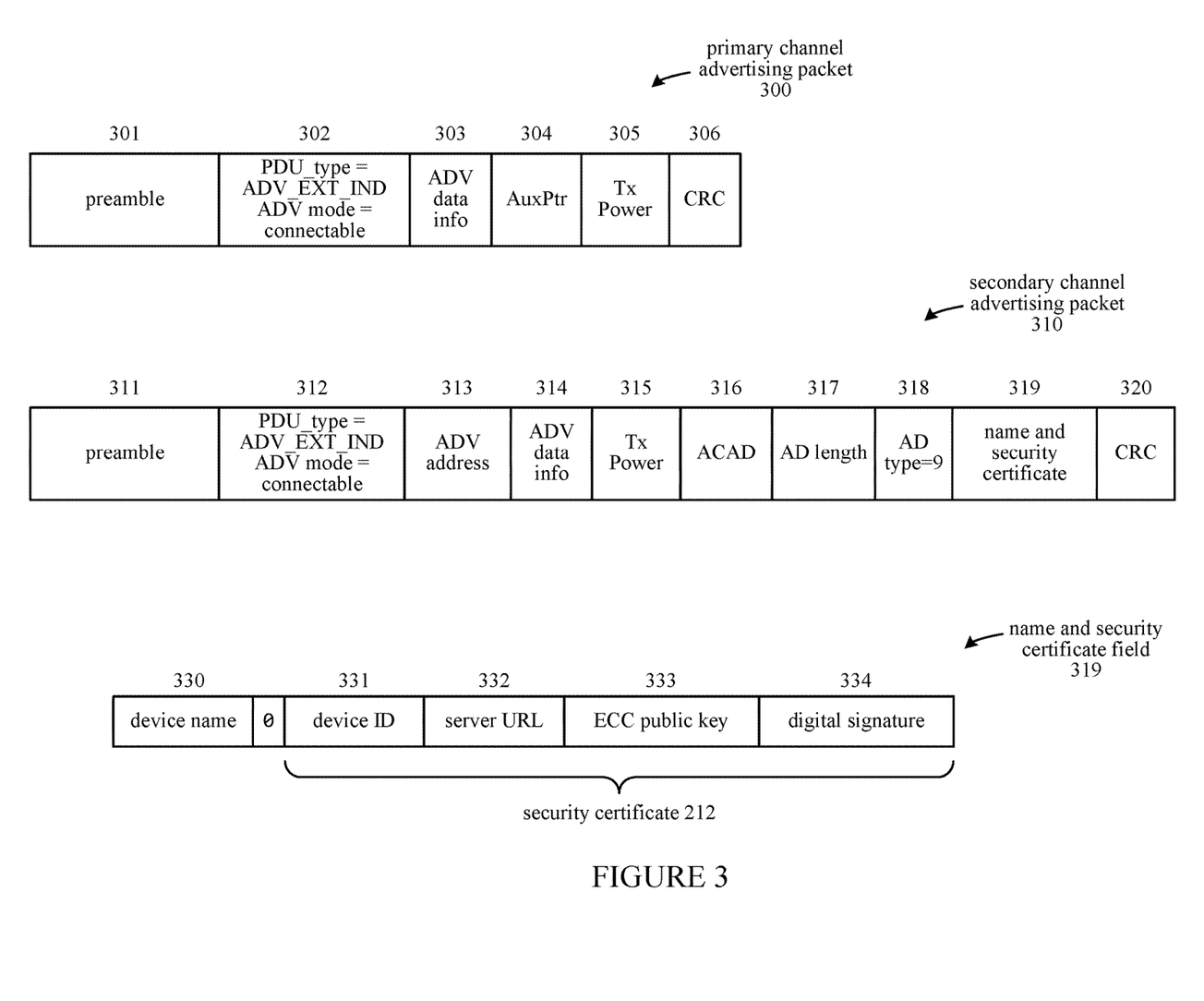
FIG. 3 illustrates advertising packets on primary and secondary advertising channels, according to an embodiment.

FIG. 3 illustrates a BLE advertisement frame transmitted by a peripheral device 101, according to an embodiment. The packet 300 is transmitted on the primary advertising channel, and the packet 310 is transmitted on the second advertising channel. The primary channel advertising packet 300 includes the preamble 301, protocol data unit type (PDU_type) 302, advertising data information (ADV data info) 303, AuxPtr 304, transmit (Tx) power level 305, and cyclic redundancy check (CRC) 306 fields. In the primary channel advertising packet 300, the PDU_type 302 is set to 'ADV_EXT_IND', indicating that additional data is available through an advertisement on the secondary advertising channel. The AuxPtr field 304 is a reference to the secondary advertising channel packet 310, and identifies the channel number on which the additional data is transmitted.

The secondary channel advertising packet 310 includes the preamble 311, PDU_type 312, ADV address 313, ADV data info 314, Tx power level 315, Additional Controller Advertising Data (ACAD) 316, AD length 317, AD type 318, name 319, and CRC 320 fields. In the secondary channel advertising packet 310, the ADV address field 313 contains the address of the advertising peripheral device 101, an AD length is selected to indicate the length of the payload data 319, and an AD type of '9' indicates that the payload data 319 is a name field that stores the complete name of the advertising peripheral device 101.

The secondary advertising channel is capable of advertising a payload of about 250 bytes, which is sufficient for advertising an ECC public key based security certificate. The security certificate 212 is included in the name field 319. In one embodiment, the security certificate 212 is appended following the complete name 330 of the device 101, and separated from the name by a delimiter (e.g., zero). The security certificate 212 include fields for each of a device identifier 331 for the peripheral device 101, an elliptic-curve cryptography (ECC) public key 333 of the peripheral device 101, a uniform resource locator (URL) 332 of the authentication server 103, and a digital signature 334 of the authentication server 103. In one embodiment, the secondary channel advertising packet 310 includes selected segments of the security certificate 212; alternatively, the entire certificate 212 is included. In alternative embodiments, other types of network addresses may be used for identifying the server 103 in the advertising packet 310 instead of a URL such as, for example, an Internet Protocol Version 6 (IPV6) address.

Figure 4A:
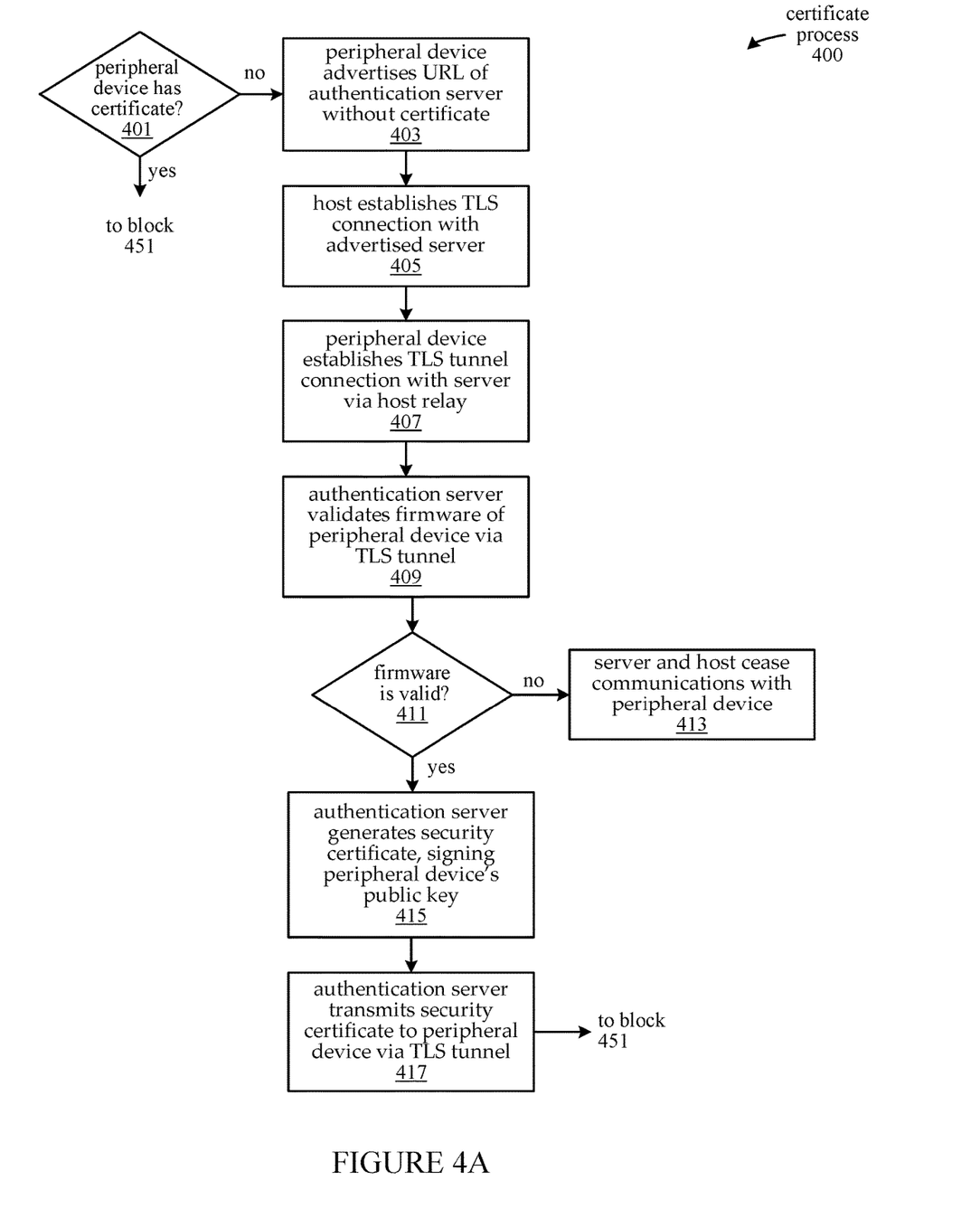
FIG. 4A is a flow diagram illustrating a process for obtaining a security certificate, according to an embodiment.
Figure 4B:
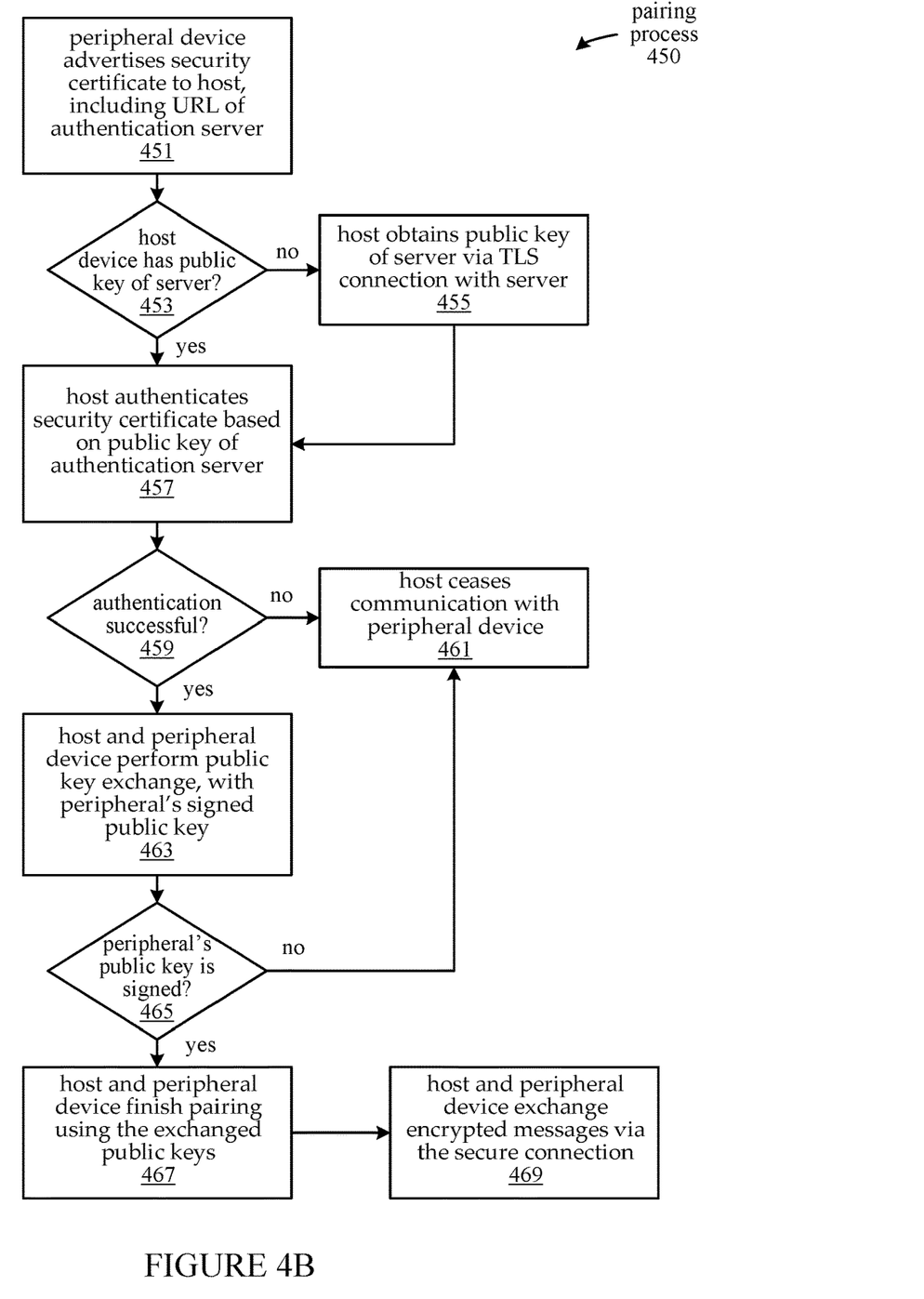
FIG. 4B is a flow diagram illustrating a process for pairing a peripheral device and a host device, according to an embodiment.

FIGS. 4A and 4B illustrate a process for generating a certificate for a wireless peripheral device and subsequently pairing the peripheral device with a host device, according to an embodiment. The certificate process 400 and pairing process 450 are performed by components of the computer network system 100, including the peripheral device 101, host device 102, and authentication server 103.

In one embodiment, the certificate process 400 is performed during quality assurance (QA) for the peripheral device 101, and a special host device 102 is dedicated for assisting the certificate generation 400. Alternatively, an end-user's device (e.g., phone, tablet, personal computer, etc.) can function as the host device 102. The certificate process 400 is performed when the peripheral device 101 does not have a device-specific security certificate. In the following embodiments, the peripheral device 101, host device 102, and server 103 utilize TLS for establishing secure connections with each other; however, in alternative embodiments, other secure communication protocols may be used.

At block 401, if the peripheral device 101 already has a security certificate, the process 400 for obtaining the certificate is bypassed, and the pairing process 450 is performed, starting at block 451. If the peripheral device 101 does not have a security certificate, the process 400 continues from block 401 to block 403. At block 403, the peripheral device 101 advertises an address (e.g., a URL) of the authentication server 103. The peripheral device 101 transmits advertising packets 300 and 310, including only the address of the authentication server 103 in the payload field 319, since a certificate is not available.

At block 405, the host device 102 receives the address of the authentication server 103 from the advertisement packet 310, then establishes a TLS connection with the advertised authentication server 103. At block 407, the peripheral device 101 establishes a TLS tunnel connection to the authentication server 103 through the host device 102; i.e., messages transmitted from the peripheral device 101 to the authentication server 103 are first transmitted from the peripheral device 101 to the host device 102 over the wireless medium, then the host device 102 relays them from the host device 102 to the authentication server 103 via the TLS connection between the host device 102 and the authentication server 103. Messages from the peripheral device 101 to the server 103 are thus protected by end-to-end encryption between them, so the host device 102 is unable to view or modify the messages.

At block 409, the authentication server 103 validates the firmware in the peripheral device 101 via the TLS tunnel between the peripheral device 101 and the server 103. In one embodiment, the peripheral device 101 transmits a firmware ID corresponding to its current firmware. The server 103 receives the firmware ID and generates a set of random firmware block addresses for the identified firmware. The random block addresses are transmitted to the peripheral device 101, which calculates hash values based on the identified blocks of its firmware. The peripheral device 101 then transmits the calculated hash values back to the server 103 along with its public key. The server 103 performs a lookup in its firmware database 232 to compare the received hash values with stored hash values corresponding to the firmware ID and block addresses.

At block 411, the firmware of the peripheral device 101 is not validated if the received hash values do not match the stored values in the firmware database 232. In this case, the server 103 and the host device 102 cease communications with the peripheral device 101, as provided at block 413. At block 411, if the received hash values match the hash values stored in the firmware database 232, then the firmware is validated and the process 400 continues at block 415.

At block 415, the authentication server generates a security certificate for the peripheral device 101, signing the peripheral device's public key in the certificate. At block 417, the authentication server 103 transmits the certificate to the peripheral device 101 via the TLS tunnel. The server 103 also transmits the peripheral device's certificate to the host device 102 via its TLS connection with the host device 102. The peripheral device 101 and the host device 102 each receive a copy of the peripheral device's security certificate and store the certificate in their respective memory systems for later use.

After the peripheral device 101 has obtained a copy of its device-specific security certificate 212 in which its public key is signed, the pairing process 450 can be performed to establish a secure connection between the peripheral device 101 and the host device 102. The pairing process 450 begins at block 451, in which the peripheral device 101 advertises its security certificate 212 to the host device 102. The peripheral device 101 wirelessly broadcasts a packet 300 on the primary advertising channel that refers to additional information available on the secondary advertising channel. On the secondary advertising channel, the peripheral device 101 broadcasts a packet 310 that includes the security certificate 212. The packet 310 also includes a network address (i.e., URL 332) of the authentication server 103.

At block 453, the host device 102 receives the advertised URL 332 of the authentication server 103 at its wireless interface 112. The host device 102 attempts to locate a public key for the server 103 by performing a lookup in its public key database 222 using the received URL 332 of the server 103. If the lookup does not return a public key for the server 103, then the host obtains the public key from the server 103 via a TLS connection with the server 103, as provided at block 455. Otherwise, if the lookup returns the public key of the server 103, the process 450 continues at block 457.

At block 457, the host device 102 authenticates the security certificate 212 of the peripheral device 101 using the public key of the authentication server 103. At block 459, if the authentication is not successful, then the host device 102 ceases communication with the peripheral device 101, as provided at block 461. If the authentication is successful, the process 450 continues from block 459 to block 463.

At block 463, the host device 102 and peripheral device 101 perform a public key exchange. The host device 102 transmits a randomly generated temporary ECC public key, and the peripheral device responds by transmitting the public key 213 signed in the authenticated security certificate 212 to the host device 102. At block 465, the host device 102 determines whether the received public key 213 is signed in the authenticated certificate 212. If not, the host 102 ceases communication with the peripheral device 101. If the public key 213 is correctly signed in the authenticated certificate 212, the process 450 continues at block 467.

At block 467, the host device 102 and peripheral device 101 complete the pairing process using the exchanged public keys. In one embodiment, the pairing is completed according to the Just Works pairing mode. Accordingly, the peripheral device 101 establishes a secure connection with the host device 102 by computing a pair of Elliptic Curve Diffie-Hellman (ECDH) keys for the peripheral device. The host also computes a pair of ECDH keys for the host device. When pairing is complete, a secure communication channel is established between the peripheral device 101 and the host 102, with the computed ECDH key pairs used to encrypt messages. At block 469, the host 102 and peripheral 101 devices exchange one or more encrypted messages via the secure connection.

Figure 5A:
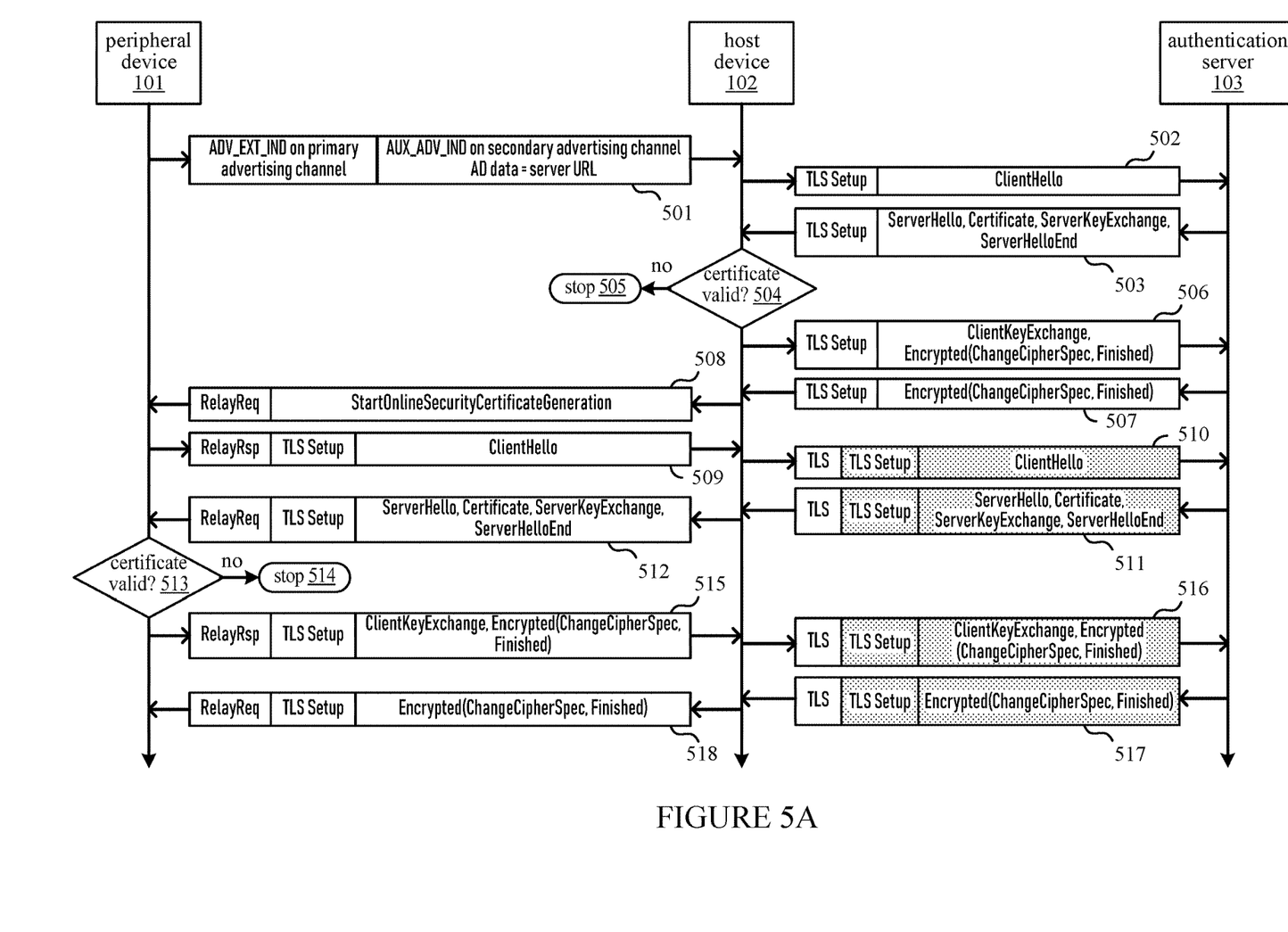
FIGS. 5A and 5B illustrate a process for obtaining a security certificate, according to an embodiment.
Figure 5B:
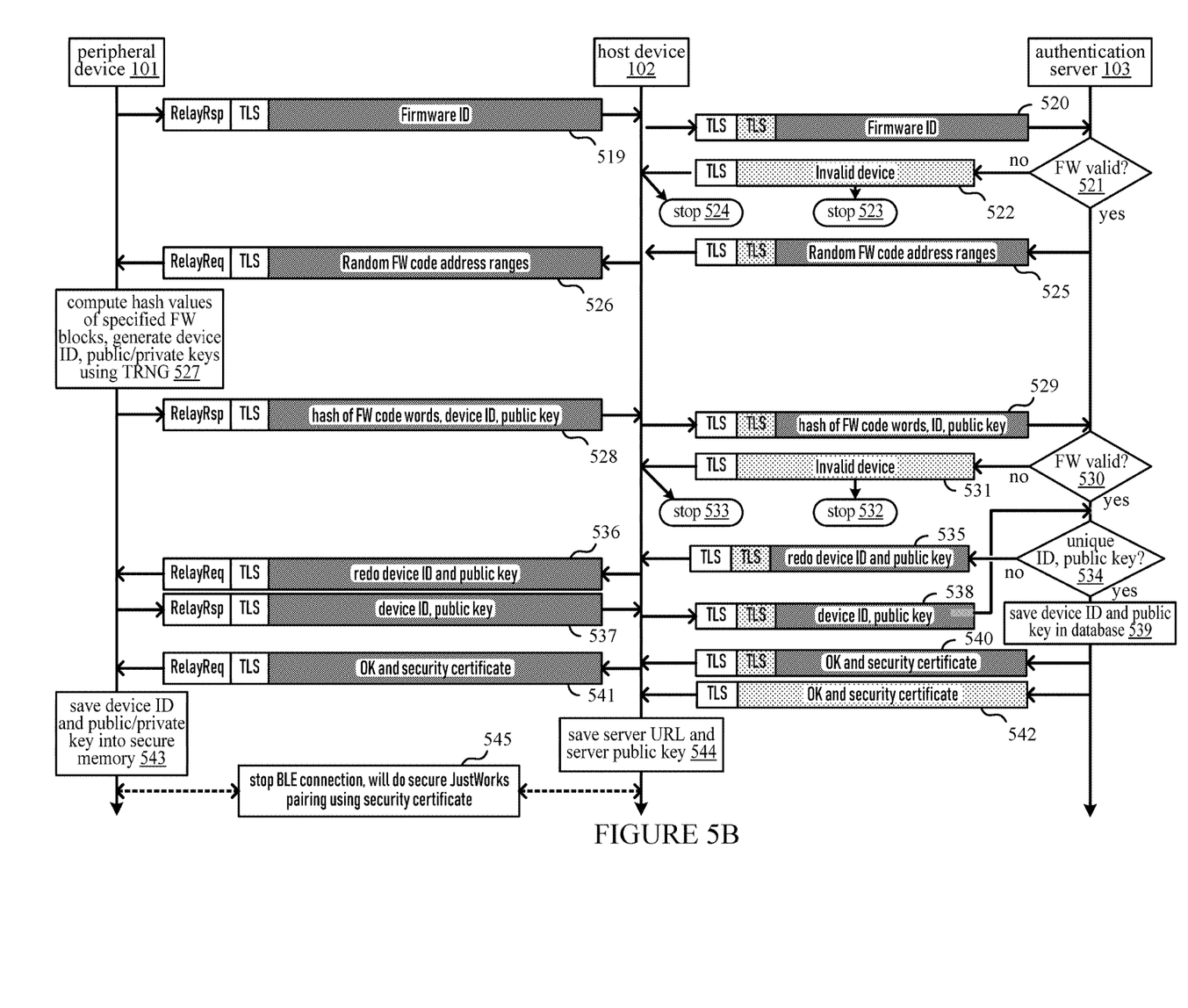

FIGS. 5A and 5B illustrate the sequence of communications between the peripheral device 101, host device 102, and authentication server 103 during the online certificate generation process 400. The certificate generation process begins with the broadcast 501 of ADV_EXT_IND in an advertising packet 300 on the primary advertising channel and AUX_ADV_IND in an advertising packet 310 on the secondary advertising channel, with the AD data including the URL of the authentication server 103.

The host device 102 receives the advertisement packets 501 and responds by sending a TLS setup 'ClientHello' 502 to the server 103 to establish a secure TLS connection with the server 103. The server 103 responds by returning 'ServerHello' with its certificate and public key 503 to the host 102. At 504, the host device 102 verifies that the received security certificate of the server 103 is valid. The security certificate of the server 103 is issued by a major certificate authority; thus, the CA's public key is readily available to the host device 102. The security certificate 237 of the authentication server 103 is used to prove to the host device 102 the public key received from the authentication server 103 belongs to the server 103.

If the server 103's certificate is not successfully verified, the host device 102 aborts the TLS connection setup with the server 103 and, at 505, stops communication with the peripheral device 101. At 505, the host device 102 cannot trust the authenticating server 103 due to failure to authenticate the server 103's certificate. Therefore, the host device 102 silently drops its connection with the server 103 (i.e., ceases communication without notifying the server 103) to minimize the chance of being tricked into any unsafe communications.

In one embodiment, a device in the system 100 such as the peripheral device 101, host device 102, or authentication server 103 ceases communications via a connection with another device by recording in its own memory an indication that the connection is to be terminated. Such an indication can include, for example, information identifying the connection to be terminated (e.g., a network address, device identifier, etc.), the assertion of a flag associated with the connection (e.g., in a data structure or registers associated with the connection), an indication of a timeout period during which no further communications should occur, etc. In some embodiments, an error message indicating that the connection is terminated may also be displayed or otherwise communicated to the user.

Thus, in one embodiment, the network address of a server 103 having a certificate that could not be authenticated (or other information identifying the connection being aborted) is recorded in a memory 220 of the host device 102, and future communication with the server 103 is avoided for a predetermined amount of time (e.g., a protocol or application timeout period). The host device 102 does not transmit any further communications to the server 103 and waits for a protocol or application-specified connection timeout to elapse. Both the peripheral device 101 and the authentication server 103 return to their original states after the timeout has elapsed.

At 504, if the server 103's certificate is valid, the host 102 and server 103 complete the TLS connection setup at 506 and 507. Subsequent messages transmitted between the host 102 and server 103 are encrypted; the light shading (510, 511, 516, and 517) in FIG. 5A indicates messages that can be decrypted by the host 102 or server 103.

The host device 102 pairs with the peripheral device 101 using normal Just Works mode, which is susceptible to MITM attack. The host device 102 then informs the peripheral device 101 that it can start the online security certificate generation process 400 with the server by transmitting 'StartOnlineSecurity-CertificateGeneration' 508 to the peripheral device 101. Without receiving this as the first message after pairing, the peripheral device 101 that does not have a certificate reverts to using the normal Just Works pairing mode.

The peripheral device 101 responds to the 'StartOnlineSecurity-CertificateGeneration' message 508 by transmitting a request 509 to setup a secure TLS tunnel connection between the peripheral device 101 and the server 103, with messages relayed through the host 102. The host 102 relays the peripheral device 101's TLS setup request 510 to the server 103, which returns its certificate and public key 511 and 512 to the peripheral device 101. The peripheral device 101 exchanges its TLS records with the server 103 over a relay protocol via the host device 102. The host device 102 relays the TLS records to and from the server 103 but cannot modify them during the pre-encryption phase. After the encryption takes effect, the host device 102 is unable to view or modify the data. This prevents a MITM attack during the online security certificate generation process.

At 513, the peripheral device 101 determines whether the server 103's security certificate is valid. If not, then the peripheral device aborts the certificate generation process 400 at 514, and ceases communications with the host device 102. At 514, the peripheral device 101 cannot trust the authenticating server 103 due to failure to authenticate the server 103's certificate. Therefore, the peripheral device 101 silently drops its connection with the server 103 to minimize the chance of being tricked into any unsafe communications. In one embodiment, the peripheral device 101 records an indication in its own memory 210 that its connection with the server 103 is dropped, and future communication with the server 103 is avoided for a predetermined amount of time. At 514, if the certificate is valid, the peripheral device 101 and server 103 complete setup of the TLS tunnel connection through the host device 102 with transmissions 515, 516, 517, and 518.

Referring to FIG. 5B, the light shading (522, 531, 542) indicates messages that can be decrypted by the host 102 or server 103, while the dark shading (519, 520, 525, 523, etc.) indicates messages that can be decrypted by the peripheral device 101 or server 103, but not the host device 102. Once the secure TLS tunnel connection is established between the peripheral device 101 and the server 103, the peripheral device 101 transmits its firmware ID 519 and 520 in encrypted form to the server 103 via the TLS tunnel. At 521, if the server 103 determines that the firmware is invalid (e.g., based on a lookup of the received firmware ID in the firmware database 232), then the server 103 transmits an 'invalid device' error message 522 to the host device 102 and aborts 523 the certificate generation process 400. Upon receiving the 'invalid device' error 522 indicating that the peripheral device does not have a correct firmware ID, the host device 102 also aborts 524 and ceases communication with the peripheral device 101. The host device 102 also stops communicating with the server 103 since the server 103 already ceased communication at 523.

At 521, if the firmware is valid (e.g., the firmware ID is successfully located in one or more entries in the firmware database 232), the server 103 identifies a subset of firmware block addresses corresponding to the firmware ID in the firmware database 232, then randomly selects one or more of the addresses for the firmware validation process. The server 103 transmits the randomly selected firmware code addresses 525 and 526 to the peripheral device. Each of the transmitted addresses identifies a block of code from the firmware identified by the received firmware ID. At 527, the peripheral device 101 receives the block addresses and computes hash values for the specified blocks from its own firmware. The peripheral device 101 also generates a device ID and an ECC public and private key pair using a true random number generator (TRNG). The computed firmware hash values, device ID, and public key 528 and 529 are then transmitted to the server via the TLS tunnel.

The server 103 receives a hash value for each of the requested firmware block addresses and at 530, the server 103 compares the received firmware hash values with the expected hash values (e.g., 253) stored in its firmware database 232 that correspond to the firmware ID of the peripheral device 101 and the requested block addresses 525 and 526. Alternatively, the expected hash values are calculated on demand using a copy of the firmware code stored in the firmware database 232. If the received hash values do not match the expected hash values, then the firmware is invalid. From 530, the server 103 transmits an 'invalid device' error message 531 to the host device 102. The server 103 aborts 532 the certificate generation process 400. Upon receiving the 'invalid device' error 531, the host device 102 also aborts 533 the certificate generation process 400. Both the server 103 and host 102 cease communication with the peripheral device 101.

At 530, if the received firmware hash values match the expected firmware hash values, the firmware of the peripheral device 101 is valid and at 534, the server determines whether the device ID and public key received from the peripheral device 101 are unique (e.g., by performing a lookup of the device ID in its peripheral device database 236). If the device ID and/or public key are not unique (e.g., they are already being used by another peripheral device), the server 103 transmits a request 535 and 536 to the peripheral device 101 for the peripheral device 101 to generate a new device ID and public key.

In response to receiving the request 536, the peripheral device 101 generates and transmits a new device ID and public key 537 and 538 to the server 103. The new device ID and public key 537 are checked for uniqueness at block 534. Thus, while the device ID and/or public key is not unique in the peripheral device database 236, the server 103 repeatedly requests that the peripheral device 101 regenerate device ID and public key values until unique values are generated or a timeout elapses. If the timeout is reached, the server 103 sends an 'invalid device' error message to the host device 102 via the TLS connection between the host device 102 and the server 103, causing both the server 103 and the host device 102 to abort the certificate generation process 400 and cease communication with the peripheral device 101.

At 534, if unique device ID and public key values are received before the timeout condition is triggered, the server 103 saves the device ID and public key in the database 236, as provided at 539. After the unique device ID and public key for the peripheral device 101 are obtained, the server 103 generates the security certificate for the peripheral device 101. The generated certificate signs the server 103's URL, the unique device ID, and the public key of the peripheral device 101 using the server 103's private key.

The server 103 transmits an 'OK' message with the generated certificate 540 and 541 to the peripheral device 101 via the TLS tunnel. The peripheral device receives the certificate and at 543 saves the certificate, the approved device ID, and the public and private key pair into secure memory in its memory system 210. The peripheral device 101 updates its advertising information to include the security certificate. At 545, the peripheral device 101 then terminates the existing BLE connection with the host device 102 (because it could be under a MITM attack), and waits for the host device 101 (or another device) to initiate pairing in secure Just Works mode.

The server 103 also transmits an 'OK' message with the certificate 542 of the peripheral device 101 to the host device 102. At 544, the host device 102 saves the URL and public key of the server 103 in its public key database 222 for use in a subsequent pairing process 450. After receiving the 'OK' message 542 from the server 103, the host device 102 closes its TLS connection with the server 103 and, at 545, terminates its BLE connection with the peripheral device 101 (because it could be under man-in-the-middle attack). The host device 102 can then restart a secure Just Works pairing process that uses the peripheral device 101's new security certificate.

Figure 6:
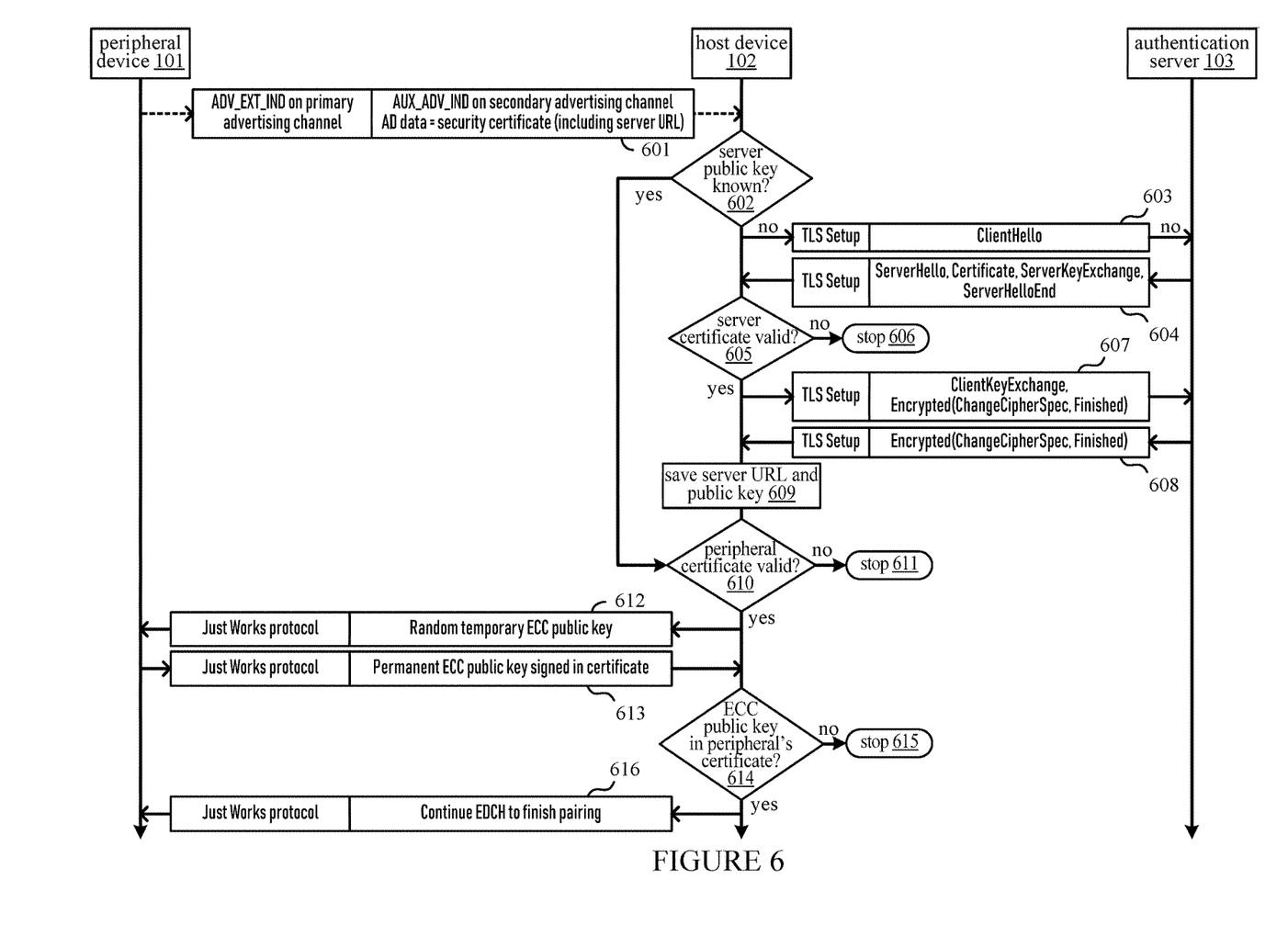
FIG. 6 illustrates a process for pairing a peripheral device and a host device, according to an embodiment.

FIG. 6 illustrates the sequence of communications between the peripheral device 101, host device 102, and authentication server 103 during the secure pairing process 450. The pairing process 450 begins with the broadcast 601 of ADV_EXT_IND in an advertising packet 300 on the primary advertising channel and AUX_ADV_IND in an advertising packet 310 on the secondary advertising channel, with the AD data containing the security certificate of the peripheral device 101. The security certificate includes the unique device ID of the peripheral device 101, the network address (i.e., URL) of the authentication server 103, the ECC public key of the peripheral device 101, and a digital signature. The security certificate allows the host device 102 to prove that the ECC public key broadcast by the peripheral device 101 actually belongs to the peripheral device 101 rather than to a MITM attacker.

The host device 102 receives the URL of the authentication server 103 and attempts to locate a public key for the server 103 by performing a lookup of the URL in its public key database 222. If the public key database 222 contains the public key of the server 103, the host device 102 obtains the public key from the database 222 and proceeds to the next step 610. Otherwise, if the public key database 222 does not contain the public key of the advertised server 103, the host device 102 initiates setup of a TLS connection with the server 103 based on the advertised URL. The host device transmits a 'ClientHello' message 603 to the server 103, which responds by transmitting to the host device 102 a 'ServerHello' message 604 along with the server 103's certificate and public key.

At 605, the host device 102 determines whether the certificate received from the server 103 is valid. The certificate is issued by a major CA whose public key is already known to the host device 102; thus, the host 102 attempts to validate the certificate based on the public key of the issuing CA. If the host device 102 determines that the server 103's certificate is not valid, then the host device 102 aborts the pairing process 450 as provided at 606 (similar to 505 in FIG. 5A). At 605, if the host device 102 determines that the server 103's certificate is valid, then the host device 102 and server 103 complete the TLS connection setup 607 and 608. At 609, the host device 102 saves the URL and public key of the server 103 in its public key database 222.

Having obtained the public key of the authentication server 103, the host device 102, at 610, uses the public key of the server 103 to verify the digital signature in the security certificate 212 advertised by the peripheral device 101. If the signature does not match, the host device 102 fails to authenticate the peripheral device 101's security certificate and aborts the pairing process 450, as provided at 611. At 611, the host device 102 failed to validate the peripheral device 101's certificate, so the host device 102 silently drops the connection to the peripheral device 101 to minimize the chance of being tricked into any unsafe communications with the peripheral device 101. However, if the peripheral device 101's advertised security certificate is successfully validated, then from 610, the host device 102 begins a public key exchange with the peripheral device 101 by transmitting a random temporary ECC public key 612 to the peripheral device 101. The peripheral device 101 receives the temporary ECC key 612 from the host device at its wireless communication interface 111.

In response to receiving the temporary ECC public key 612, the peripheral device 101 transmits its permanent signed ECC public key, which is signed in the advertised security certificate 212. The host device 102 receives the peripheral device 101's public key and, at 614, the host device 102 verifies that the peripheral device 101's public key is signed in its security certificate. If not, the host device 102 fails to authenticate the signed public key based on the security certificate and aborts the pairing process at 615, ceasing communication with the peripheral device 101. At 615, the host device 102 finds the peripheral device 101 did not transmit the public key that is signed in the advertised certificate, which does not follow the protocol. The peripheral device 101 is therefore regarded as untrustworthy and the host device 102 silently drops its connection with the peripheral device 101 to minimize the chance of being tricked into any unsafe communications with the peripheral device 101.

At 614, if the host device 102 validates the peripheral device 101's public key by determining that the public key is properly signed in the peripheral device 101's advertised security certificate, then from 614, the host device 102 continues the pairing process according to the Just Works pairing mode. The secure connection is established by computing a pair of Elliptic Curve Diffie-Hellman (ECDH) keys in each of the peripheral device and the host device. Once the secure connection is established, the peripheral device 101 and host device 102 are paired and exchange messages encrypted using the ECDH key pairs via the secure connection.

The foregoing certificate generation process 400 and pairing process 450 thus prevent MITM attacks, since the security certificate advertised by the BLE peripheral device 101 can prove to the initiating host BLE device 102 that the ECC public key sent by the peripheral device 101 in the ECDH-based secure pairing protocol indeed belongs to the peripheral device 101. This prevents a MITM attacker from fooling the host BLE device into accepting the attacker's own ECC public key.

A peripheral device 101 in which the above secure pairing mode is implemented is able to default gracefully to the basic Just Works pairing mode (that is susceptible to MITM attacks) when pairing is initiated by a host device in which the secure pairing process 450 is not implemented. The peripheral device 101 sends the same signed ECC public key to the initiating host device in either case. If the secure pairing process 450 is not implemented in the host device, then the host device generates a random ECC public key for the public key exchange and proceeds according to the Just Works procedure without authenticating the peripheral device's ECC public key. If the secure pairing process 450 is implemented in the host device 102, then the host device 102 authenticates the peripheral device 101's ECC public key prior to completing the Just Works pairing.

In the foregoing embodiments, various modifications can be made; for example, signals described as being asserted with a high voltage may instead be asserted with a low voltage, or specified components can be replaced with other components having similar functionality. As described herein, conductive electrodes that are "electrically connected" or "electrically coupled" may be coupled such that a relatively low resistance conductive path exists between the conductive electrodes. Quantities, dimensions, or other values described as "substantially" equal may be nominally equal but need not be exactly equal (with variations due to manufacturing tolerances, environmental conditions, quantization or rounding error, and/or other factors), or may be sufficiently close to equal for achieving an intended effect or benefit.

Embodiments described herein include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the claimed subject matter has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

What is claimed is:

1. A method, comprising:
    transmitting, on a primary wireless advertising channel of a peripheral device, a reference to a secondary wireless advertising channel of the peripheral device;
    broadcasting one or more segments of a security certificate on the secondary wireless advertising channel, wherein at least one of the segments of the security certificate identifies an authentication server;
    participating in a public key exchange between the peripheral device and the host device by transmitting a signed public key of the peripheral device, wherein the signed public key is signed in the security certificate; and
    transmitting one or more encrypted messages from the peripheral device to the host device via a first secure connection separate from the secondary wireless advertising channel, wherein the first secure connection is established based on the public key.

2. The method of claim 1, wherein:
    the at least one of the segments of the security certificate identifies the authentication server by indicating a network address of the authentication server.

3. The method of claim 2, wherein:
the one or more segments of the security certificate comprise a device identifier for the peripheral device, a public key of the peripheral device, and a digital signature of the authentication server.

4. The method of claim 1, further comprising, in response to receiving from the peripheral device a network address of the authentication server:
based on the network address, establishing a second secure connection between the host device and the authentication server; and
in response to authenticating the security certificate based on a public key of the authentication server, complete pairing between the peripheral device and the host device.

5. The method of claim 1, wherein:
the public key exchange is performed in response to the host device authenticating the security certificate based on a public key of the authentication server;
the public key exchange comprises transmitting a randomly generated key from the host device to the peripheral device; and
transmitting the signed public key of the peripheral device is performed in response to receiving the randomly generated key from the host device.

6. The method of claim 5, wherein:
in response to receiving the one or more segments of the security certificate at the host device, checking a public key database for a public key of the authentication server based on a network address of the authentication server; and
in response to failing to locate a public key of the authentication server in the public key database,
obtaining the public key of the authentication server by establishing a second secure connection with the authentication server.

7. The method of claim 1, further comprising obtaining the security certificate from the authentication server by:
in response to authenticating a security certificate of the authentication server, establishing a second secure connection between the host device and the authentication server;
establishing a secure tunnel connection between the peripheral device and the authentication server by relaying, via the host device, messages between the peripheral device and the authentication server; and
receiving the security certificate from the authentication server via the secure tunnel connection.

8. The method of claim 1, further comprising, at the authentication server:
receiving a firmware identifier from the peripheral device;
in response to locating the received firmware identifier in a firmware database, transmitting a set of randomly generated firmware block addresses to the peripheral device;
for each block identified in the set of randomly generated firmware block addresses, receiving a hash associated with the block from the peripheral device; and
in response to validating each of the received hashes, generating the security certificate for the peripheral device.

9. The method of claim 1, further comprising ceasing communication with the peripheral device in response to one of:
failing to authenticate the security certificate based on a public key of the authentication server;
failing to authenticate the signed public key based on the security certificate; and
failing to authenticate one or more hash values calculated from firmware blocks of the peripheral device, wherein the hash values are received from the peripheral device.

10. A peripheral device, comprising:
a wireless communication interface; and
a processor coupled with the wireless communication interface, wherein the processor is configured to:
on a primary wireless advertising channel of a peripheral device, transmit via the wireless communication interface a reference to a secondary wireless advertising channel of the peripheral device;
broadcast via the wireless communication interface one or more segments of a security certificate on the second wireless advertising channel, wherein at least one of the one or more segments of the security certificate identifies an authentication server;
participating in a public key exchange between the peripheral device and a host device by transmitting via the wireless communication interface a signed public key of the peripheral device, wherein the signed public key is signed in the security certificate; and
transmit via the wireless communication interface one or more encrypted messages from the peripheral device to the host device via a first secure connection separate from the secondary wireless advertising channel, wherein the first secure connection is established based on the public key.

11. The peripheral device of claim 10, wherein:
the one or more segments of the security certificate indicate a device identifier for the peripheral device, an public key of the peripheral device, a network address of the authentication server and a digital signature of the authentication server.

12. The peripheral device of claim 10, wherein:
the wireless communication interface is configured to, during the public key exchange, receive a randomly generated key from the host device; and
the processor is further configured to, in response to receiving the randomly generated key from the host device during the public key exchange, transmit via the wireless communication interface the signed public key of the peripheral device via the wireless communication interface.

13. The peripheral device of claim 10, wherein the processor is further configured to obtain the security certificate from the authentication server by:
establishing a secure tunnel connection between the peripheral device and the authentication server by relaying, via the host device, messages between the peripheral device and the authentication server; and
receiving the security certificate from the authentication server via the secure tunnel connection.

14. A system, comprising:
a first wireless communication interface in a host device, wherein the first wireless communication interface is configured to:
receive a broadcast transmission containing a reference to a secondary wireless advertising channel of the peripheral device on a primary wireless advertising channel of the peripheral device;
based on the reference, receive one or more segments of a security certificate via the secondary wireless advertising channel, wherein at least one of the one or more segments of the security certificate identifies an authentication server; and a first processor in the host device, wherein the first processor is coupled with the first wireless communication interface and is configured to:
   authenticate the security certificate based on a public key of the authentication server;
   participate in a public key exchange between the peripheral device and the host device by receiving, via the first wireless communication interface, a signed public key of the peripheral device, wherein the signed public key is signed in the security certificate; and
   transmit one or more encrypted messages from the host device to the peripheral device via a first secure connection separate from the secondary wireless advertising channel, wherein the first secure connection is established based on the signed public key.

15. The system of claim 14, further comprising:
a network interface in the host device, wherein the first processor is coupled with the network interface and is configured to:
   in response to receiving the one or more segments of the security certificate, attempt to locate a public key of the authentication server in a public key database based on a network address of the authentication server;
   in response to failing to locate a public key of the authentication server in the public key database, obtain the public key by establishing, via the network interface, a second secure connection with the authentication server; and
   complete pairing with the peripheral device over the first wireless communication interface in response to authenticating the security certificate based on a public key of the authentication server.

16. The system of claim 14, wherein the first processor is configured to:
   establish, via the network interface, a second secure connection between the host device and the authentication server; and
   cease communication with the peripheral device over the first wireless communication interface in response to failing to authenticate the security certificate based on the public key of the authentication server.

17. The system of claim 14, wherein the first processor is configured to:
   establish the first secure connection by computing a pair of keys for the host device in response to authenticating the signed public key of the peripheral device based on the security certificate, and
   cease communication with the peripheral device in response to one of failing to authenticate the security certificate based on the public key of the authentication server, and failing to authenticate the signed public key based on the security certificate.

18. The system of claim 14, further comprising:
a second wireless communication interface in the peripheral device; and
a second processor in the peripheral device, wherein the second processor is coupled with the second wireless communication interface and is configured to:
   establish a secure tunnel connection between the peripheral device and the authentication server by relaying, via the host device, messages between the peripheral device and the authentication server; and
   receive the security certificate from the authentication server via the secure tunnel connection.

19. The system of claim 14, further comprising:
a second wireless communication interface; and
a second processor in the peripheral device, wherein the second processor is coupled with the second wireless communication interface and is configured to:
   perform the public key exchange by:
      receiving, at the second wireless communication interface, a randomly generated key from the host device, and
      in response to receiving the randomly generated key from the host device, transmitting the signed public key via the second wireless communication interface; and
   establish the first secure connection with the host device by computing a pair of keys for the peripheral device.

20. The system of claim 14, further comprising:
a network interface in the authentication server, wherein the authentication server is configured to receive a firmware identifier from the peripheral device;
a firmware database configured to store an expected hash value for each of a plurality of firmware block addresses; and
a second processor in the authentication server, wherein the second processor is configured to:
   in response to locating in the firmware database a subset of the plurality of firmware block addresses corresponding to the received firmware identifier, transmit a set of one or more randomly selected firmware block addresses from the subset of firmware block addresses to the peripheral device via the network interface,
   receive a set of a hash values from the peripheral device, wherein the set of hash values comprises a hash value for each block identified in the set of randomly selected firmware block addresses,
   in response to validating the received set of hash values based on the expected hash values, generate the security certificate for the peripheral device, wherein validating the set of hash values comprises comparing each hash value in the set of hash values with a corresponding expected hash value from the firmware database, and
   in response to failing to authenticate the received set of hash values, cease communication with the peripheral device.

* * * * *